(12) United States Patent
Zhang et al.

(10) Patent No.: US 9,967,010 B2
(45) Date of Patent: May 8, 2018

(54) DATA TRANSMISSION METHOD AND APPARATUS

(71) Applicant: HUAWEI TECHNOLOGIES CO., LTD., Shenzhen, Guangdong (CN)

(72) Inventors: Shunqing Zhang, Shenzhen (CN); Yan Chen, Shanghai (CN); Yungang Li, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/080,593

(22) Filed: Mar. 25, 2016

(65) Prior Publication Data

US 2016/0211896 A1    Jul. 21, 2016

Related U.S. Application Data

(63) Continuation of application No. PCT/CN2013/084404, filed on Sep. 27, 2013.

(51) Int. Cl.
*H04B 7/02* (2017.01)
*H04L 1/02* (2006.01)
(Continued)

(52) U.S. Cl.
CPC .......... *H04B 7/0456* (2013.01); *H04B 7/024* (2013.01); *H04B 7/0478* (2013.01); *H04J 11/0053* (2013.01)

(58) Field of Classification Search
CPC .. H04B 7/0639; H04B 7/0482; H04B 7/0456; H04B 7/024; H04J 11/0053
See application file for complete search history.

(56) References Cited

U.S. PATENT DOCUMENTS

2007/0049218 A1    3/2007  Gorokhov et al.
2009/0046702 A1    2/2009  Luo et al.
(Continued)

FOREIGN PATENT DOCUMENTS

CN    101888637 A    11/2010
CN    101984572 A    3/2011
(Continued)

OTHER PUBLICATIONS

Hosein Nikopour et al. SCMA for Downlink Multiple Access of 5G Wireless Networks, IEEE Global Communications Conference, Dec. 2014. total 6 pages.
(Continued)

*Primary Examiner* — Shuwang Liu
*Assistant Examiner* — Sung Ahn
(74) *Attorney, Agent, or Firm* — Huawei Technologies Co., Ltd.

(57) ABSTRACT

The patent application discloses data transmission method, a base station, network controller and terminal. The base station includes a receiver, configured to receive codebook instruction from a network controller; a processor, configured to select one or more coordination codebooks from the one or more codebooks specified in the codebook instruction; and a transmitter, configured to send a codebook notification to the terminal. One or more codebooks that can be used by the base station in data transmission with a terminal are specified in the codebook instruction. The selected one or more coordination codebooks are specified in the codebook notification. The base station is one of a coordinating cluster of base stations that perform data transmission with the terminal.

26 Claims, 11 Drawing Sheets

(51) Int. Cl.
  *H04B 7/0456* (2017.01)
  *H04J 11/00* (2006.01)
  *H04B 7/024* (2017.01)
  *H04B 7/04* (2017.01)

(56) References Cited

U.S. PATENT DOCUMENTS

| | | | |
|---|---|---|---|
| 2010/0027456 A1* | 2/2010 | Onggosanusi | H04B 7/024 370/312 |
| 2010/0091892 A1 | 4/2010 | Gorokhov | |
| 2011/0064051 A1* | 3/2011 | Clerckx | H04B 7/022 370/331 |
| 2011/0103503 A1 | 5/2011 | Shin et al. | |
| 2012/0014272 A1* | 1/2012 | Zhou | H04L 5/0035 370/252 |
| 2012/0082042 A1* | 4/2012 | Lunttila | H04B 7/0626 370/252 |
| 2012/0170676 A1 | 7/2012 | Tajer et al. | |
| 2013/0121439 A1 | 5/2013 | Zhu et al. | |
| 2014/0140360 A1 | 5/2014 | Nikopour et al. | |
| 2014/0169408 A1 | 6/2014 | Bayesteh et al. | |

FOREIGN PATENT DOCUMENTS

| | | |
|---|---|---|
| CN | 101989894 A | 3/2011 |
| CN | 102056320 A | 5/2011 |
| CN | 102244567 A | 1/2012 |
| RU | 2392751 C2 | 8/2006 |
| WO | 2014090189 A1 | 6/2014 |

OTHER PUBLICATIONS

Razieh Razavi et al. On Receiver Design for Uplink Low Density Signature OFDM (LDS-OFDM), IEEE Transactions on Communications, vol. 60, No. 11, Nov. 2012, total 10 pages.

Thiele L. et al., "Interference Management for Future Cellular OFDMA Systems Using Coordinated Multi-Point Transmission", Invited Paper—Special Section on Wireless Distributed Networks, IEICE Transactions Communications, vol. E93-B, Dec. 12, 2010, pp. 3228-3237.

Yang C. et al., "How Do We Design CoMP to Achieve Its Promised Potential?", Multicell Cooperation, IEEE Wireless Communications, Feb. 2013, pp. 67-74.

Lee D. et al.,"Coordinated Multipoint Transmission and Reception in LTE-Advanced: Deployment Scenarios and Operational Challenges", LTE-Advanced and 4G Wireless Communications, IEEE communications Magazine, Feb. 2012, pp. 148-155.

Hosein N. et al., "Sparse Code Multiple Access", IEEE 24th International Symposium on Personal, Indoor and Mobile Radio Communications (PIMRC): Fundamentals and PHY Track, Sep. 8-11, 2013, pp. 332-336, 5 pages.

Mohammed Al-imari et al:"performance evaluation of low density spreading multiple access", Aug. 27, 2012, XP32253331, 6 pages.

* cited by examiner

DATA TRANSMISSION METHOD AND APPARATUS

CROSS-REFERENCE TO RELATED APPLICATIONS

This patent application is a continuation of International Application No. PCT/CN2013/084404, filed on Sep. 27, 2013, which is hereby incorporated by reference in its entirety.

TECHNICAL FIELD

The present patent application relates to the field of communications technologies, and in particular, to a data transmission method and apparatuses.

BACKGROUND

Base station coordinated transmission refers to multiple base stations in separated geographic locations coordinately participating in data transmission for one terminal, or jointly receiving data from one terminal. The multiple base stations participating in the coordination are generally base stations of different cells. According to the base station coordination technology, a user device on a cell's edge is served by several base stations on a same frequency, and the several base stations serve the user device at the same time, so as to improve coverage for the edge user device. By using base station coordination, interference between the cells can be reduced, and, primarily, spectral efficiency of a cell edge user device can be improved.

In a current implementation solution of the base station coordination, an amount of information exchanged between network nodes is relatively large. As a result, data transmission is relatively complex in a coordination process, the impact on a backhaul system in a network is significant, and network transmission is inefficient.

SUMMARY

The present patent application provides a data transmission method and apparatuses, which aimed to resolve a problem of relatively high network information exchange overheads in a base station coordinated communications system.

To achieve the foregoing objective, the following technical solutions are used.

According to a first aspect, a base station provided by embodiments of the application includes:

a receiver, configured to receive codebook instruction from a controller, where the codebook instruction is used to specify a codebook that can be used by the base station in data transmission with a terminal; the codebook belongs to a common sparse code codebook set; the common sparse code codebook set is a set of sparse code codebooks that can be used by each base station in a coordinating cluster to perform data transmission; and the coordinating cluster is a cluster of base stations that provide data transmission for a same terminal, where codebooks that can be used by the base stations in the coordinating cluster in data transmission with the terminal are mutually different;

a transmitter, configured to send a codebook notification to the terminal, where the codebook notification is used to notify the terminal of a coordination codebook; the coordination codebook is a codebook that is used by a base station in the coordinating cluster to perform data transmission with the terminal; and the coordination codebook belongs to a codebook specified in a codebook instruction received by the base station in the coordinating cluster; and a processor, configured to use the coordination codebook to perform data transmission with the terminal.

In a first possible implementation manner of the first aspect, the transmitter is further configured to:

send a codebook request to the controller, where the codebook request carries information about a minimum quantity of codebooks needed by the base station, so that the controller allocates, according to the minimum quantity of codebooks, the codebook that can be used by the base station in data transmission, where the codebook instruction is further used to specify a codebook that can be used by the base station to perform data transmission, where a quantity of codebooks specified in the codebook instruction is not less than the minimum quantity of codebooks.

With reference to the first aspect or the first possible implementation manner of the first aspect, in a second possible implementation manner of the first aspect, the processor is further configured to:

determine, according to a quantity of data flows in data transmission, the minimum quantity of codebooks needed, where the minimum quantity of codebooks is not less than the quantity of data flows.

With reference to the first aspect or the first or the second possible implementation manner of the first aspect, in a third possible implementation manner of the first aspect, the receiver is further configured to receive the common sparse code codebook set from the controller; and the processor is further configured to determine, from the common sparse code codebook set according to the codebook instruction, the codebook that can be used by the base station in data transmission.

With reference to the first aspect or any one of the first to the third possible implementation manners of the first aspect, in a fourth possible implementation manner of the first aspect, the codebook instruction further includes coordinating cluster information; and the processor is further configured to determine, according to the coordinating cluster information, a coordinating cluster applicable to the codebook instruction.

With reference to the first aspect or any one of the first to the fourth possible implementation manners of the first aspect, in a fifth possible implementation manner of the first aspect, the transmitter is further configured to:

send the common sparse code codebook set to the terminal, so that the terminal receives and saves the common sparse code codebook set, and so that the terminal determines, from the common sparse code codebook set according to the codebook notification, the coordination codebook for performing data transmission with the base station.

According to another aspect, a controller provided by embodiments of the application includes:

a processor, configured to determine a coordinating cluster, where the coordinating cluster is a cluster of base stations that provide data transmission for a same terminal; and a transmitter, configured to send a codebook instruction to each base station in the coordinating cluster, where the codebook instruction is used to specify a codebook that can be used by each base station in the coordinating cluster in data transmission with the terminal; the codebooks that can be used by the base stations in data transmission belong to a common sparse code codebook set and are mutually different; and the common sparse code codebook set is a set of sparse code codebooks that can be used by each base station in the coordinating cluster to perform data transmission.

In a first possible implementation manner of the second aspect, the controller further includes a receiver, configured to receive a codebook request from each base station in the coordinating cluster, where the codebook request carries information about a minimum quantity of codebooks needed by the base station; and the processor is further configured to determine, according to the information about the minimum quantity of codebooks, a proportion of the minimum quantity of codebooks for each base station in the coordinating cluster, and determine, according to the proportion of the minimum quantity of codebooks, a proportion of a quantity of codebooks that can be used by each base station in the coordinating cluster in data transmission with the terminal.

With reference to the second aspect or the first possible implementation manner of the second aspect, in a second possible implementation manner of the second aspect, the codebook instruction is further used to specify a codebook that can be used by each base station in the coordinating cluster in data transmission, where a quantity of codebooks specified in the codebook instruction is not less than the minimum quantity of codebooks.

With reference to the second aspect, or the first or the second possible implementation manner of the second aspect, in a third possible implementation manner of the second aspect, the codebook instruction further includes coordinating cluster information, where the coordinating cluster information is used by the base station receiving the codebook instruction to determine, according to the coordinating cluster information, a coordinating cluster applicable to the codebook instruction.

With reference to the second aspect or any one of the first to the third possible implementation manners of the second aspect, in a fourth possible implementation manner of the second aspect, the transmitter is further configured to:

send the common sparse code codebook set to each base station in the coordinating cluster, so that each base station in the coordinating cluster receives and saves the common sparse code codebook set, and so that each base station in the coordinating cluster determines, from the common sparse code codebook set according to the codebook instruction, a coordination codebook for performing data transmission with the terminal, where the coordination codebook is a codebook that is used by a base station in the coordinating cluster to perform data transmission with the terminal.

According to another aspect, a terminal provided by embodiments of the application includes:

a receiver, configured to receive a codebook notification from at least one base station in a coordinating cluster, where the codebook notification is used by the at least one base station to notify the terminal of a coordination codebook; the coordination codebook is a sparse code codebook that is used by the at least one base station to perform data transmission with the terminal; and the coordinating cluster is a cluster of base stations that provide data transmission for a same terminal, where sparse code codebooks that can be used by the base stations in the coordinating cluster in data transmission with the terminal are mutually different; and a processor, configured to use the coordination codebook to perform data transmission with the at least one base station.

In a first possible implementation manner of the third aspect, the receiver is further configured to receive and save a common sparse code codebook set from a base station in the coordinating cluster; and the processor is further configured to determine, from the common sparse code codebook set, the coordination codebook according to the codebook notification.

With reference to the third aspect or the first possible implementation manner of the third aspect, in a second possible implementation manner of the third aspect, the processor is further configured to:

use the coordination codebook to decode at least one received data flow from the at least one base station.

With reference to the third aspect, or the first or the second possible implementation manner of the third aspect, in a third possible implementation manner of the third aspect, if the processor fails in decoding the at least one data flow, the terminal further includes:

a transmitter, configured to send a retransmission request to a base station that sends the data flow that fails to be decoded, where the retransmission request is used to request the base station that sends the data flow that fails to be decoded to resend the data flow that fails to be decoded.

According to another aspect, a data transmission method provided by embodiments of the application includes:

receiving, by a base station, a codebook instruction from a controller, where the codebook instruction specifies a codebook that can be used by the base station in data transmission with a terminal; the codebook belongs to a common sparse code codebook set; the common sparse code codebook set is a set of sparse code codebooks that can be used by each base station in a coordinating cluster to perform data transmission; and the coordinating cluster is a cluster of base stations that provide data transmission for a same terminal, where codebooks that can be used by the base stations in the coordinating cluster in data transmission with the terminal are mutually different;

sending, by the base station, a codebook notification to the terminal, where the codebook notification is used to notify the terminal of a coordination codebook; the coordination codebook is a codebook that is used by a base station in the coordinating cluster to perform data transmission with the terminal; and the coordination codebook belongs to a codebook specified in a codebook instruction received by the base station in the coordinating cluster; and using, by the base station, the coordination codebook to perform data transmission with the terminal.

In a first possible implementation manner of the fourth aspect, before the receiving, by a base station, the codebook instruction from the controller, the method further includes:

sending a codebook request to the controller, where the codebook request carries information about a minimum quantity of codebooks needed by the base station, so that the controller allocates, according to the minimum quantity of codebooks, the codebook that can be used by the base station in data transmission, where the codebook instruction is further used to specify a codebook that can be used by the base station to perform data transmission, where a quantity of codebooks specified in the codebook instruction is not less than the minimum quantity of codebooks.

With reference to the fourth aspect or the first possible implementation manner of the fourth aspect, in a second possible implementation manner of the fourth aspect, the base station determines, according to a quantity of data flows in data transmission, the minimum quantity of codebooks needed, where the minimum quantity of codebooks is not less than the quantity of data flows.

With reference to the fourth aspect, or the first or the second possible implementation manner of the fourth aspect, in a third possible implementation manner of the fourth aspect, before the sending, by the base station, the codebook notification to the terminal, the method further includes:

receiving, by the base station, the common sparse code codebook set from the controller; and determining, by the base station from the common sparse code codebook set according to the codebook instruction, the codebook that can be used by the base station in data transmission.

With reference to the fourth aspect or any one of the first to the third possible implementation manners of the fourth aspect, in a fourth possible implementation manner of the fourth aspect, the codebook instruction further includes coordinating cluster information; and the base station determines, according to the coordinating cluster information, a coordinating cluster applicable to the codebook instruction.

With reference to the fourth aspect or any one of the first to the fourth possible implementation manners of the fourth aspect, in a fifth possible implementation manner of the fourth aspect, before the sending, by the base station, the codebook notification to the terminal, the method further includes:

sending, by the base station, the common sparse code codebook set to the terminal, so that the terminal receives and saves the common sparse code codebook set, and so that the terminal determines, from the common sparse code codebook set according to the codebook notification, the coordination codebook for performing data transmission with the base station.

According to another aspect, a data transmission method provided by embodiments of the application includes:

determining, by a controller, a coordinating cluster, where the coordinating cluster is a cluster of base stations that provide data transmission for a same terminal; and sending, by the controller, a codebook instruction to each base station in the coordinating cluster, where the codebook instruction is used to specify a codebook that can be used by each base station in the coordinating cluster in data transmission with the terminal; the codebooks that can be used by the base stations in data transmission belong to a common sparse code codebook set and are mutually different; and the common sparse code codebook set is a set of sparse code codebooks that can be used by each base station in the coordinating cluster to perform data transmission.

In a first possible implementation manner of the fifth aspect, before the sending, by the controller, the codebook instruction to each base station in the coordinating cluster, the method further includes:

receiving, by the controller, a codebook request from each base station in the coordinating cluster, where the codebook request carries information about a minimum quantity of codebooks needed by the base station;

determining, by the controller according to the information about the minimum quantity of codebooks, a proportion of the minimum quantity of codebooks for each base station in the coordinating cluster; and determining, by the controller according to the proportion of the minimum quantity of codebooks, a proportion of a quantity of codebooks that can be used by each base station in the coordinating cluster in data transmission with the terminal.

With reference to the fifth aspect or the first possible implementation manner of the fifth aspect, in a second possible implementation manner of the fifth aspect, the codebook instruction is further used to specify a codebook that can be used by each base station in the coordinating cluster in data transmission, where a quantity of codebooks specified in the codebook instruction is not less than the minimum quantity of codebooks.

With reference to the fifth aspect, or the first or the second possible implementation manner of the fifth aspect, in a third possible implementation manner of the fifth aspect, the codebook instruction further includes coordinating cluster information, where the coordinating cluster information is used by the base station receiving the codebook instruction to determine, according to the coordinating cluster information, a coordinating cluster applicable to the codebook instruction.

With reference to the fifth aspect or any one of the first to the third possible implementation manners of the fifth aspect, in a fourth possible implementation manner of the fifth aspect, before the sending, by the controller, the codebook instruction to each base station in the coordinating cluster, the method further includes:

sending, by the controller, the common sparse code codebook set to each base station in the coordinating cluster, so that each base station in the coordinating cluster receives and saves the common sparse code codebook set, and so that each base station in the coordinating cluster determines, from the common sparse code codebook set according to the codebook instruction, a coordination codebook for performing data transmission with the terminal, where the coordination codebook is a codebook that is used by a base station in the coordinating cluster to perform data transmission with the terminal.

According to another aspect, a data transmission method provided by embodiments of the application includes:

receiving, by a terminal, a codebook notification from at least one base station in a coordinating cluster, where the codebook notification is used by the at least one base station to notify the terminal of a coordination codebook; the coordination codebook is a sparse code codebook that is used by the at least one base station to perform data transmission with the terminal; and the coordinating cluster is a cluster of base stations that provide data transmission for a same terminal, where sparse code codebooks that can be used by the base stations in the coordinating cluster in data transmission with the terminal are mutually different; and using, by the terminal, the coordination codebook to perform data transmission with the at least one base station.

In a first possible implementation manner of the sixth aspect, before the receiving, by a terminal, the codebook notification from at least one base station in the coordinating cluster, the method further includes:

receiving and saving, by the terminal, a common sparse code codebook set from a base station in the coordinating cluster; and determining, by the terminal from the common sparse code codebook set, the coordination codebook according to the codebook notification.

With reference to the sixth aspect or the first possible implementation manner of the sixth aspect, in a second possible implementation manner of the sixth aspect, the using, by the terminal, the coordination codebook notified in the codebook notification to perform data transmission with the at least one base station is specifically:

using, by the terminal, the coordination codebook to decode at least one received data flow from the at least one base station.

With reference to the sixth aspect, or the first or the second possible implementation manner of the sixth aspect, in a third possible implementation manner of the sixth aspect, if the terminal fails in decoding the at least one data flow, the method further includes:

sending, by the terminal, a retransmission request to a base station that sends the data flow that fails to be decoded, where the retransmission request is used to request the base station that sends the data flow that fails to be decoded to resend the data flow that fails to be decoded.

In the present patent application, sparse code codebooks that can be used by a base station in a coordinating cluster in data transmission with a terminal are mutually different. This enables base stations separately performing data transmission with the terminal without performing data exchange or channel information exchange between the base stations, thereby reducing system overheads and improving network transmission efficiency.

BRIEF DESCRIPTION OF DRAWINGS

The following briefly introduces the accompanying drawings used in describing the embodiments.

DETAILED DESCRIPTION

Multiple access is a simultaneous access of a specified wireless resource by multiple user devices. Common multiple access manners include time division multiple access (TDMA), frequency division multiple access (FDMA), code division multiple access (CDMA), orthogonal frequency division multiple access (OFDMA) and so on.

Sparse code multiple access (SCMA) is a manner in which low-density sparse code is used for expansion in a specific time-frequency domain, and simultaneous access by a large quantity of user devices is implemented in a non-orthogonal manner. The SCMA allows for the amount of connected user devices being greater than the amount of orthogonal resource blocks, thereby improving resource block utilization.

Base station coordinated transmission refers to multiple base stations in separated geographic locations coordinately transmitting data to one terminal, or jointly receiving data from one terminal. In a data transmission method of an SCMA system, a sparse code codebook in a common sparse code codebook set is used for a terminal to access a base station in a coordinating cluster (a cluster of base stations participating in coordinated transmission).

Figure 1:
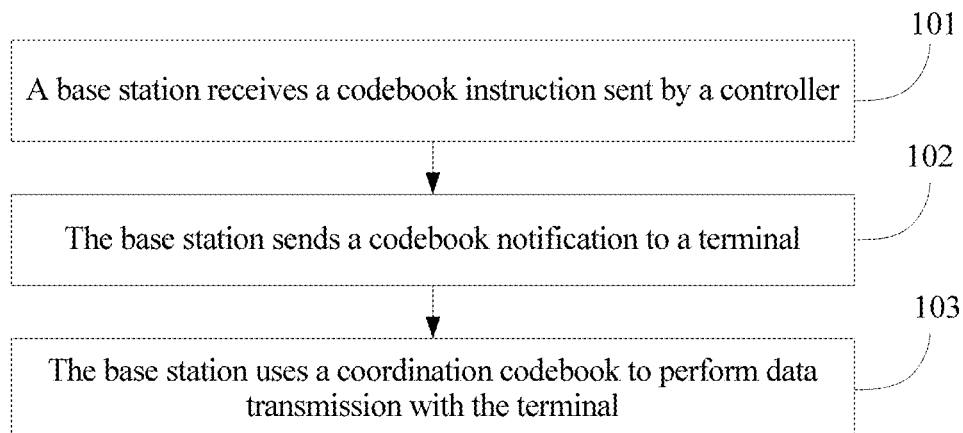
FIG. 1 is a flowchart of a data transmission method performed by a base station.

In an SCMA-based communications system, a data transmission method, as shown in FIG. 1, includes the following:

101: A Base Station Receives a Codebook Instruction from a Controller.

The base station provided in embodiments of the application refers to various devices having a power amplifier (PA), such as a base station, a relay, or a wireless access point (AP) in various forms in a communications system.

Optionally, when a base station belongs to several coordinating clusters at the same time, the base station receives a codebook instruction from the controller, where the codebook instruction includes coordinating cluster information. The base station determines, according to the coordinating cluster information, a coordinating cluster applicable to the codebook instruction. For example, a base station 0 belongs to a coordinating cluster 0 and a coordinating cluster 1 at the same time. When a controller sends a codebook instruction 0 to the base station 0, the controller further specifies that the codebook instruction 0 is applicable to the coordinating cluster 0. Alternatively, when the controller sends a codebook instruction 1 to the base station 0, the controller further specifies that the codebook instruction 1 is applicable to the coordinating cluster 1.

After receiving the codebook instruction from the controller, the base station may determine at least one codebook that can be used to perform data transmission, and the at least one codebook is in a common sparse code codebook set of the coordinating cluster. The codebook instruction may be, but is not limited to, formatted to carry information of the codebook in various forms, for example, directly carrying the codebook itself, carrying a codebook index number, a codebook serial number, or the like. The common sparse code codebook set is a set of sparse code codebooks that can be used by each base station in the coordinating cluster to perform data transmission. It should be noted that codebooks respectively specified by the controller for all base stations are mutually different.

In the data transmission method of the SCMA system, the sparse code codebook in the common sparse code codebook set is used for the terminal to access the base station in the coordinating cluster. When the base station performs data transmission, a codebook in the common sparse code codebook set needs to be used to complete access by the terminal and the data transmission.

The SCMA enables the quantity of connected user devices to be greater than the quantity of orthogonal resource blocks. For example, the quantity of orthogonal resource blocks is 20, whereas the quantity of user devices that can actually be connected is 30. The non-orthogonal multi-user access can greatly increase the quantity of connected user devices in limited wireless resources, thereby improving resource block utilization.

Specifically, the common sparse code codebook set may be as follows:

In the SCMA system, a sparse code access codebook set is a set of all or a part of sparse code codebooks that can be used by base stations for access. The sparse code codebooks may be, but are not limited to being, obtained by a computer by means of computation or searching. Methods for computing or searching for the sparse code codebooks are well-known, and details are not described herein.

The common sparse code codebook set may contain at least one codebook that is in a sparse code access codebook set and that can be used for base station coordination. That is, the common sparse code codebook set is a non-empty subset of the sparse code access codebook set.

Further, in the SCMA system, technical specifications of each base station may be different. That is, a sparse code codebook supported by each base station may be different.

When sparse code access codebook sets supported by each base stations in the coordinating cluster that provide data transmission for a same terminal are different, the common sparse code codebook set may include codebooks that are in the sparse code access codebook set and are supported by every base station in the coordinating cluster.

Optionally, acquiring the common sparse code codebook set by the base station includes:

Before receiving the codebook instruction from the controller, the base station receives and saves a common sparse code codebook set sent by the controller.

Optionally, acquiring the common sparse code codebook set by the base station includes:

In a network planning or network optimization process, an operator directly sets and saves an available common sparse code codebook set for use by the base station directly. Alternatively, in a network operation process, a relevant network control node, such as a mobility management entity (MME), sets or updates a common sparse code codebook set, and saves the common sparse code codebook set for use by the base station directly.

Specifically, after the base station acquires the common sparse code codebook set, if the codebook instruction from the controller carries only a codebook serial number, the base station may determine, according to the acquired common sparse code codebook set and the codebook serial number that is carried in the codebook instruction, the codebook that can be used to perform data transmission. For example, if the common sparse code codebook set acquired by the base station is S1={C11, C12, . . . , C16}, and the codebook instruction carries not the codebooks but codebook serial numbers 4 and 5, the base station can determine that C14 and C15 in S1 are codebooks that can be used to perform data transmission.

Optionally, before receiving the codebook instruction from the controller, the base station sends a codebook request to the controller, where the codebook request carries information about a minimum quantity of codebooks needed by the base station. The controller allocates, according to the minimum quantity of codebooks, the codebooks that can be used by the base station in data transmission.

An actual quantity of data flows that need to be used by each base station is different, and a traffic volume burdened by each base station is different. Therefore, in a data transmission process, a minimum quantity of codebooks each base station needs is different. The base station may send, to the controller according to an actual operation requirement of the base station itself, the codebook request carrying the information about the minimum quantity of codebooks the base station needs.

Further, determining the minimum quantity of codebooks the base stations needs may include:

The base station determines, according to a quantity of data flows in data transmission, that the minimum quantity of codebooks is not less than the quantity of data flows. For example, when a base station serves a terminal, two data flows are needed to meet a data transmission requirement of the terminal. Therefore, a minimum quantity of codebooks, reported by the base station is two. It should be noted that the base station may further report, according to an actual requirement, a minimum quantity of codebooks greater than a quantity of the data flows. For example, it can be predicted based on methods such as a traffic volume model that to-be-started data transmission needs to be carried by an extra data flow.

The controller may obtain, according to an acquired codebook request from each base station in the coordinating cluster, information about a minimum quantity of codebooks needed by each base station. The controller may allocate a quantity of codebooks that are in the common sparse code codebook set that can be used by each base station in the coordinating cluster in data transmission, and further send the codebook instruction to the base station. The codebook instruction specifies codebooks that can be used by the base station to perform data transmission, where a quantity of codebooks specified in the codebook instruction is not less than the minimum quantity of the codebooks.

Upon receiving the codebook instruction from the controller, the base station may determine the codebooks that can be used to perform data transmission.

102: The Base Station Sends a Codebook Notification to a Terminal.

The base station sends the codebook notification to the terminal, so as to notify the terminal of a coordination codebook used for data transmission. The codebook notification may carry, and is not limited to, information about a codebook in various forms, for example, directly carrying the codebook itself, or carrying a codebook index number, a codebook serial number, or the like.

The base station may determine a coordination codebook as specified in the codebook instruction from the saved common sparse code codebook set. The coordination codebook may be determined by the base station by random selection, or may also be determined by the base station or the terminal by matching the terminal with a codebook according to a rule. The rule may be, and is not limited to, a channel quality indicator (CQI) or the like. The matching may use any well-known technical means, and details are not described herein.

Further, the base station may determine, according to the quantity of data flows in data transmission and from codebooks specified in the codebook instruction, one or more codebooks as the coordination codebooks. The quantity of the codebooks equals to the quantity of the data flows. The coordination codebooks are used by the base station to perform data transmission with the terminal.

Optionally, before sending the codebook notification to the terminal, the base station sends the acquired common sparse code codebook set to the terminal. The terminal receives and saves the common sparse code codebook set, and determines, from the saved common sparse code codebook set according to the codebook notification, the coordination codebook specified in the codebook notification for use in data transmission. Specifically, after the terminal acquires the common sparse code codebook set, if the base station sends only a codebook serial number in the codebook notification, the terminal may determine, according to the acquired common sparse code codebook set and the codebook serial number that is carried in the codebook notification, the codebook used to perform data transmission.

103: The Base Station Performs Data Transmission with the Terminal Using the Coordination Codebook.

The base station performs codebook mapping on a data flow that needs to be transmitted using the coordination codebook, and sends the data flow that has undergone the codebook mapping to the terminal. The codebook mapping may use any well-known technical means, and details are not described herein.

By using an SCMA access manner, non-orthogonal multi-user access is implemented by using a sparse code, which greatly improves a quantity of connected user devices in limited wireless resources. A base station can perform information processing independently without performing data exchange and channel information exchange between base stations, thereby reducing system overheads and improving network transmission efficiency. In addition, according to the solution provided in embodiments of the application, information exchange needs to be performed only between a base station and a controller, and does not need to be performed between base stations, which greatly reduces data transmission complexity and reduces system overheads.

Figure 2:
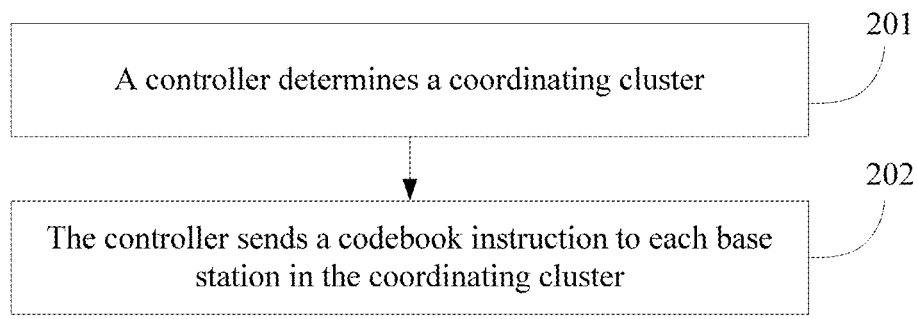
FIG. 2 is a flowchart of a data transmission method performed by a network controller.

In the SCMA communications system, a data transmission method performed by a controller, as shown in FIG. 2, includes the following:

201: A Controller Determines a Coordinating Cluster.

A coordinating cluster is a cluster of base stations that provide data transmission for a same terminal. A coordinating cluster may be formed dynamically, semi-dynamically or statically. Forming the coordinating cluster may use any well-known technical means, and details are not described herein.

202: The Controller Sends a Codebook Instruction to Each Base Station in the Coordinating Cluster.

The controller sends the codebook instruction to each base station in the coordinating cluster, to specify at least one codebook that can be used by each base station in the coordinating cluster to perform data transmission. The codebook specified is in a common sparse code codebook set of the coordinating cluster. The codebook instruction may be, and is not limited to, information carrying a codebook in multiple forms, for example, directly carrying the codebook itself or carrying a codebook index number, a codebook serial number, or the like. The common sparse code codebook set is a set of sparse code codebooks that can be used by each base station in the coordinating cluster to perform data transmission. It should be noted that codebooks respectively specified by the controller for all base stations are mutually different.

SCMA enables a quantity of connected user devices to be greater than a quantity of orthogonal resource blocks, which greatly improves the quantity of connected user devices in limited wireless resources, thereby improving resource block utilization.

Optionally, when a base station belongs to a plurality of coordinating clusters at the same time, the base station receives the codebook instruction from the controller, where the controller further needs to specify a coordinating cluster applicable to the codebook instruction. For example, a base station 0 belongs to a coordinating cluster 0 and a coordinating cluster 1 at the same time. When a controller sends a codebook instruction 0 to the base station, the controller further needs to specify that the codebook instruction 0 is applicable to the coordinating cluster 0. Alternatively, when the controller sends a codebook instruction 1 to the base station, the controller further needs to specify that the codebook instruction 1 is applicable to the coordinating cluster 1.

Optionally, acquiring, by the controller, the common sparse code codebook set is specifically as follows:

In the SCMA system, a sparse code access codebook set is a set of all or a part of sparse code codebooks that can be used by the base station for access, where the sparse code codebooks may be, but are not limited to being, obtained by a computer by means of computation or searching. Computing or searching for the sparse code codebooks can use any well-known technical means, and details are not described herein.

The controller determines, from the sparse code access codebook set, at least one codebook that can be used for base station coordination, so as to form the common sparse code codebook set. That is, the common sparse code codebook set is a non-empty subset of the sparse code access codebook set.

Further, in the SCMA system, technical specifications of each base station may be different. That is, a sparse code access codebook set supported by each base station may be different.

When sparse code access codebook sets supported by base stations, in the coordinating cluster, that provide data transmission for a same terminal are different, the controller determines, from the sparse code access codebook sets, at least one codebook supported by each base station in the coordinating cluster to form the common sparse code codebook set.

Acquiring, by the controller, the common sparse code codebook set may further be specifically as follows:

In a network planning or network optimization process, an operator directly sets and saves an available common sparse code codebook set for use by the controller directly. Alternatively, in a network operation process, a relevant network control node, such as an MME, sets or updates a common sparse code codebook set, and saves the common sparse code codebook set for use by the controller directly.

The controller sends a codebook instruction to each base station in the coordinating cluster. The codebook instruction carries a non-empty subset of the common sparse code codebook set determined by the controller. The codebook instruction specifies at least one codebook that can be used by the base station to perform data transmission, and the codebook is in the common sparse code codebook set. Further, when specifying the codebook that can be used by the base station to perform data transmission, the codebook instruction may use a codebook serial number to identify the codebook. When sending the codebook instruction, sending only the codebook serial number instead of the codebook itself can further reduce system overheads.

Optionally, before sending the codebook instruction to each base station in the coordinating cluster, the controller sends a common sparse code codebook set to each base station in the coordinating cluster. The base station receives and saves the common sparse code codebook set, so that the base station determines, from the saved common sparse code codebook set, the coordination codebook specified by the codebook instruction for use in data transmission.

Specifically, after the base station acquires the common sparse code codebook set, if the controller sends only a codebook serial number when sending the codebook instruction, the base station may determine, according to the acquired common sparse code codebook set and the codebook serial number that is carried in the codebook instruction, the codebook that can be used to perform data transmission.

Optionally, before the controller sends the codebook instruction to each base station in the coordinating cluster, the controller receives a codebook request from each base station in the coordinating cluster, where the codebook request carries information about a minimum quantity of codebooks needed by the base station.

An actual quantity of data flows that need to be used by each base station is different, and a traffic volume carried by each base station is different. Therefore, in a data transmission process, a minimum quantity of codebooks needed by each base station is different. The base station may send, to the controller according to an actual operation requirement of the base station itself, the codebook request carrying the information about the minimum quantity of codebooks needed by the base station. After receiving the codebook request, the controller can obtain the information about the minimum quantity of codebooks needed by each base station in the coordinating cluster.

Further, after the controller receives the codebook request, specifying the codebook that can be used by the base station to perform data transmission may include:

The controller may acquire, according to the codebook request received from each base station in the coordinating cluster, the information about the minimum quantity of codebooks needed by each base station, and allocate, according to a proportion of the minimum quantity of codebooks needed by each base station, a quantity of codebooks that can be used by each base station in the coordinating cluster in data transmission, and the codebooks are in the common sparse code codebook set. For example, if a quantity of codebooks in the common sparse code codebook set is six, a minimum quantity, of codebooks, reported by a base station 1 in the coordinating cluster is two, and a minimum quantity, of codebooks, reported by a base station 2 is one, the controller can allocate four codebooks to the base station 1, and allocate two codebooks to the base station 2.

Specifically, the controller may properly adjust, according to a specific situation, a codebook allocation manner. For example, when a quantity of codebooks, in the common sparse code codebook set, allocated according to a proportion is a non-integer, a quantity of codebooks allocated to each base station in a coordinating cluster may be determined by using methods including but not limited to round off or rounded-down or the like. For example, if the quantity of codebooks in the common sparse code codebook set is eight, a minimum quantity, of codebooks, reported by a base station 3 in the coordinating cluster is two, a minimum quantity, of codebooks, reported by a base station 4 in the coordinating cluster is one, and according to a proportion, quantities of codebooks allocated to the base station 3 and the base station 4 are respectively 5.33 and 2.66, the controller may allocate, according to the round off method, five codebooks to the base station 3 and allocate three codebooks to the base station 4, or may allocate, according to the rounded-down method, five codebooks to the base station 3 and allocate two codebooks to the base station 4.

After completing the allocation of the quantity of codebooks, the controller specifies a codebook that can be used by the base station to perform data transmission, where a quantity of codebooks specified in the codebook instruction is not less than the minimum quantity of codebooks, and the controller sends the codebook instruction to notify the base station.

By using an SCMA access manner, non-orthogonal multi-user access is implemented by using a sparse code, which greatly improves a quantity of connected user devices in limited wireless resources. A base station can independently perform information processing without performing data exchange and channel information exchange between base stations, thereby reducing system overheads and improving network transmission efficiency. In addition, according to the method provided in embodiments of the application, information exchange overheads required between the controller and the base station are extremely limited. At a minimum, the controller only needs to send, to the base station, a sparse code codebook that is used to perform data transmission, which has extremely small impact on a backhaul system.

Figure 3:
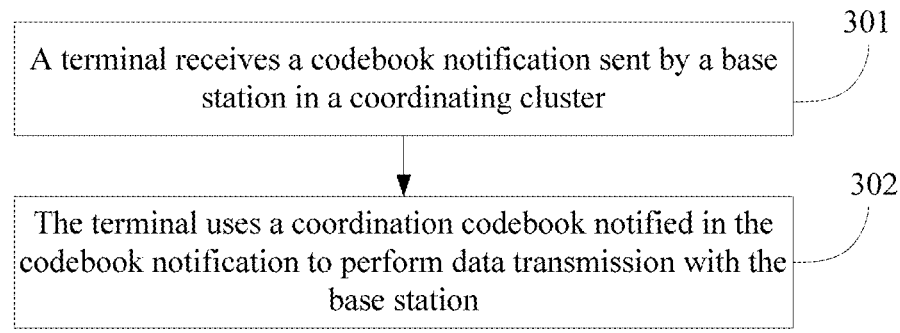
FIG. 3 is a flowchart of a data transmission method performed by a terminal.

In an SCMA communications system, a data transmission method performed by a terminal, as shown in FIG. 3, includes the following:

301: A Terminal Receives a Codebook Notification from a Base Station in a Coordinating Cluster.

After determining a coordination codebook used to perform data transmission with the terminal, the base station sends the codebook notification, where the codebook notification notifies the terminal of the coordination codebook. The codebook notification may be, and is not limited to, information carrying a codebook in multiple forms, for example, directly carrying the codebook itself or carrying a codebook index number, a codebook serial number, or the like. It should be noted that coordination codebooks of base stations in the coordinating cluster are mutually different.

After receiving the codebook notification, the terminal may determine a codebook that can be used in a data transmission process.

In the data transmission method of the SCMA system, a sparse code codebook in a common sparse code codebook set is used for the terminal to access the base station in the coordinating cluster. When the terminal performs data transmission, a codebook in the common sparse code codebook set needs to be used to complete access by the terminal and the data transmission.

SCMA enables a quantity of connected user devices to be greater than a quantity of orthogonal resource blocks, which greatly improves the quantity of connected user devices in limited wireless resources, thereby improving resource block utilization.

Acquiring the common sparse code codebook set by the terminal may include:

Before receiving the codebook notification from the base station in the coordinating cluster, the terminal may receive and save a common sparse code codebook set from the base station in the coordinating cluster. Further, optionally, because there is no information exchange between base stations in the coordinating cluster, when performing data transmission, each base station in the coordinating cluster may send a common sparse code codebook set to the terminal.

Acquiring the common sparse code codebook set by the terminal may also include:

In a terminal manufacturing process, a manufacturer or the like sets the common sparse code codebook set, and saves the common sparse code codebook set for use by the terminal directly. Alternatively, in a network operation process, a relevant network control node sets or updates the common sparse code codebook set, and saves the common sparse code codebook set for use by the terminal directly.

Specifically, after the terminal acquires the common sparse code codebook set, if the base station sends only a codebook serial number when sending the codebook instruction, the terminal may determine, according to the acquired common sparse code codebook set and the codebook serial number that is carried in the codebook instruction, the codebook that can be used to perform data transmission.

302: The Terminal Uses a Coordination Codebook Notified in the Codebook Notification to Perform Data Transmission with the Base Station.

The terminal may acquire the coordination codebook from the codebook notification. When receiving data flows from base stations in the coordinating cluster, the terminal uses the coordination codebook to decode at least one received data flow.

Decoding at least one received data flow by the terminal using the coordination codebook may include:

The terminal uses the coordination codebook to decode at least one received data flow from base stations in the coordinating cluster. If a base station 6 and a base station 7 respectively send a data flow 6 and a data flow 7 to the terminal, the terminal may perform a joint decoding, so as to respectively obtain the data flow 6 and the data flow 7. The joint decoding method is well-known, and details of which are not described herein.

Further, if the terminal fails in decoding the at least one data flow, the terminal may send a retransmission request to the base station that sends the data flow, where the retransmission request may be used to request the base station to resend the data flow. A retransmission method may be but is not limited to using the prior art such as an automatic repeat request (ARQ) and a hybrid automatic repeat request (HARM), and details are not described herein.

By using an SCMA access manner, a base station can independently perform information processing without performing data exchange and channel information exchange between base stations, thereby reducing system overheads, and improving network transmission efficiency. In addition, because the terminal can separately receive and process different data flows from different base stations, and base station can independently perform a retransmission operation on a data flow, complexity of a network data transmission process is greatly reduced and network transmission efficiency is improved.

Figure 4A:
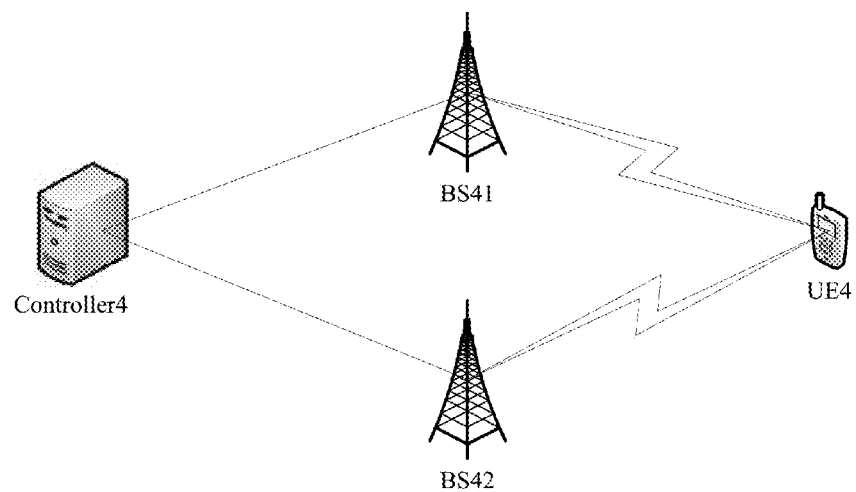
FIG. 4A is a schematic diagram of a data transmission scenario according to an embodiment of the present patent application.
Figure 4B:
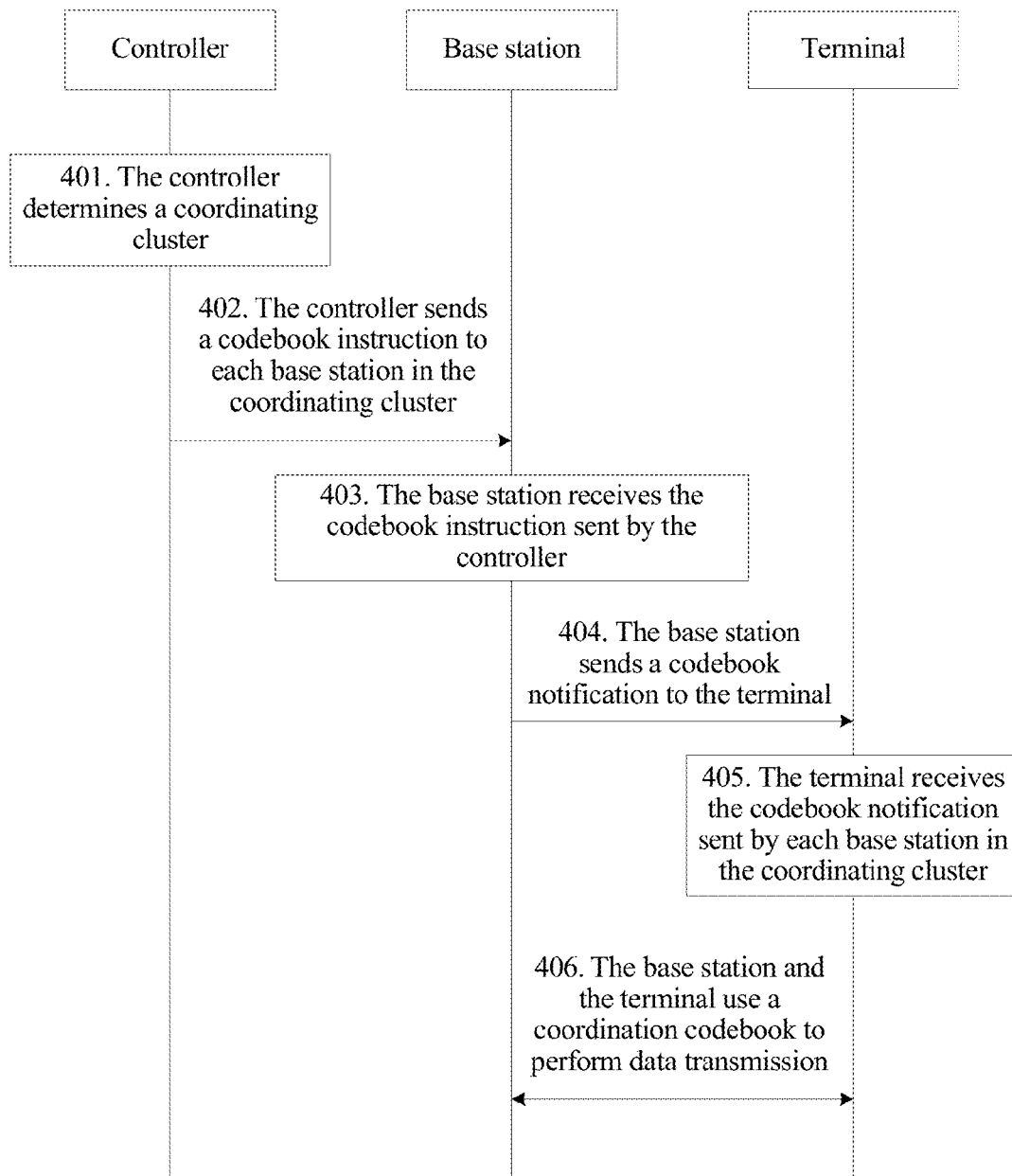
FIG. 4B is a flowchart of a data transmission process according to an embodiment of the present patent application.

In a scenario shown in FIG. 4A, base stations controlled and managed by a controller Controller4 include BS41 and BS42. A terminal UE4 is located in a common coverage area of BS41 and BS42, and requests BS41 and BS42 to perform data transmission. Controller4 determines that BS41 and BS42 form a coordinating cluster to provide a data transmission service for UE4. A data transmission method, as shown in FIG. 4B, includes the following:

401: A Controller Determines a Coordinating Cluster.

Controller4 determines that BS41 and BS42 form a coordinating cluster to perform data transmission for UE4.

402: The Controller Sends a Codebook Instruction to Each Base Station in the Coordinating Cluster.

A common sparse code codebook set of the coordinating cluster is S4={C41, C42, . . . , C46}. That is, the common sparse code codebook set has six codebooks in total, which can be used by BS41 and BS42 to perform data transmission.

Figure 4C:
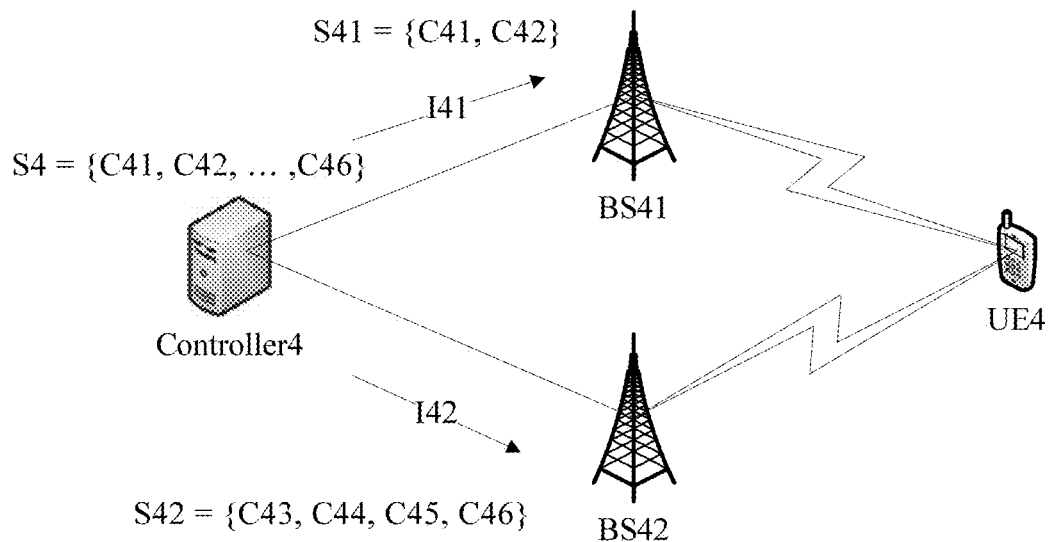
FIG. 4C is a schematic diagram of exchanging information between a controller and a base station according to an embodiment of the present patent application.

Controller4 respectively sends codebook instructions I41 and I42 to BS41 and BS42 in the coordinating cluster. As shown in FIG. 4C, I41 and I42 respectively carry non-empty subsets S41 and S42 of the common sparse code codebook set, and the non-empty subsets are determined by the controller, where S41={C41, C42} and S42={C43, C44, C45, C46}, and I41 and I42 are used to specify a codebook that can be used by BS41 and BS42 to perform data transmission.

403: A Base Station Receives the Codebook Instruction from the Controller.

After BS41 and BS42 in the coordinating cluster respectively receive the codebook instructions I41 and I42, the codebook that can be used in a data transmission process may be determined.

404: The Base Station Sends a Codebook Notification to a Terminal.

Figure 4D:
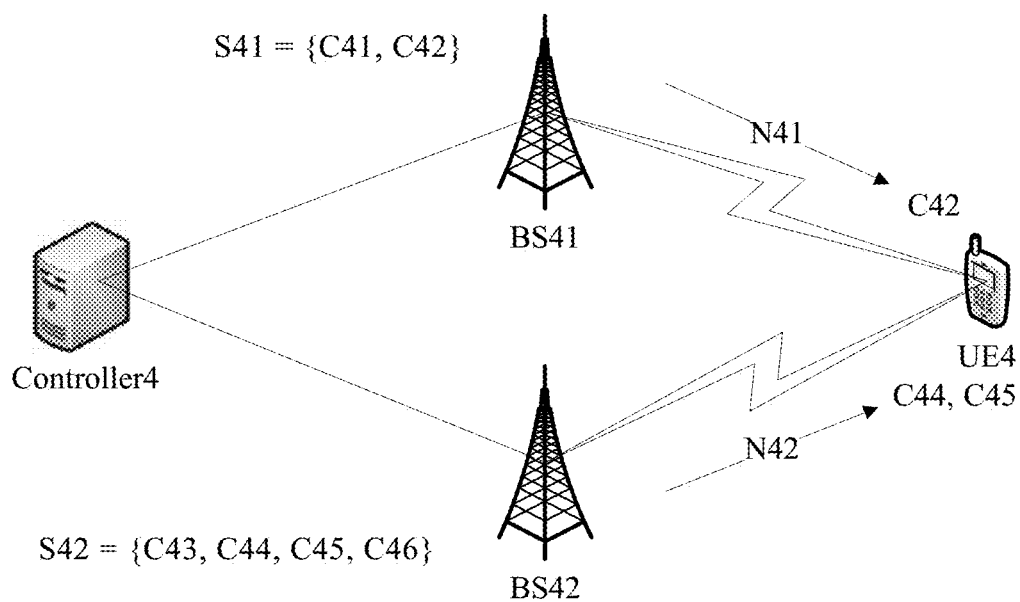
FIG. 4D is a schematic diagram of exchanging information between a base station and a terminal according to an embodiment of the present patent application.

As shown in FIG. 4D, BS41 sends a codebook notification N41 to UE4 to notify UE4 that a codebook C42 needs to be used to access BS41; BS42 sends a codebook notification N42 to UE4 to notify UE4 that C44 and C45 need to be used to access BS42.

405: The Terminal Receives the Codebook Notification from the Base Station in the Coordinating Cluster.

After receiving the codebook notifications N41 and N42 respectively from BS41 and BS42, UE4 may determine the codebook that can be used in the data transmission process. That is, UE4 uses C42 to perform data transmission with BS41, and uses C44 and C45 to perform data transmission with BS42.

406: The Base Station and the Terminal Use a Coordination Codebook to Perform Data Transmission.

After BS41 sends a data flow D41 to UE4 and uses C42 to perform codebook mapping on D41, and after BS42 sends data flows D42 and D43 to UE4 and respectively uses C44 and C45 to perform codebook mapping on D42 and D43, an actual data flow from BS41 is D41*C42, and actual data flows from BS42 are D42*C44+D43*C45, where an operation symbol * is a self-defined operation symbol, and Z=X*Y represents an operation result obtained by performing, according to a codebook Y, codebook mapping on a data flow X.

UE4 uses C42, C44, and C45 to perform joint decoding on received data flows, and respectively obtains D41, D42, and D43 by means of decoding.

Figure 5A:
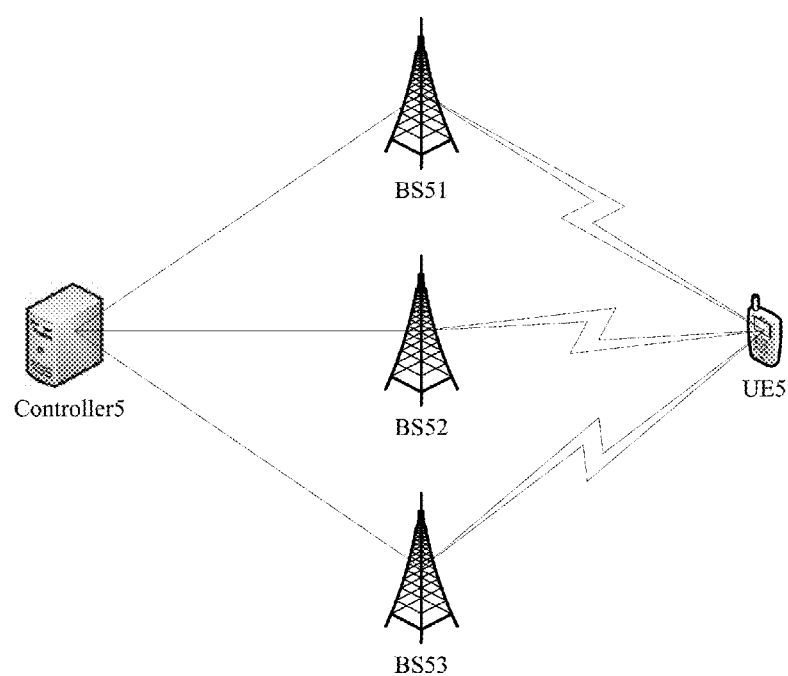
FIG. 5A is a schematic diagram of another data transmission scenario according to an embodiment of the present patent application.
Figure 5B:
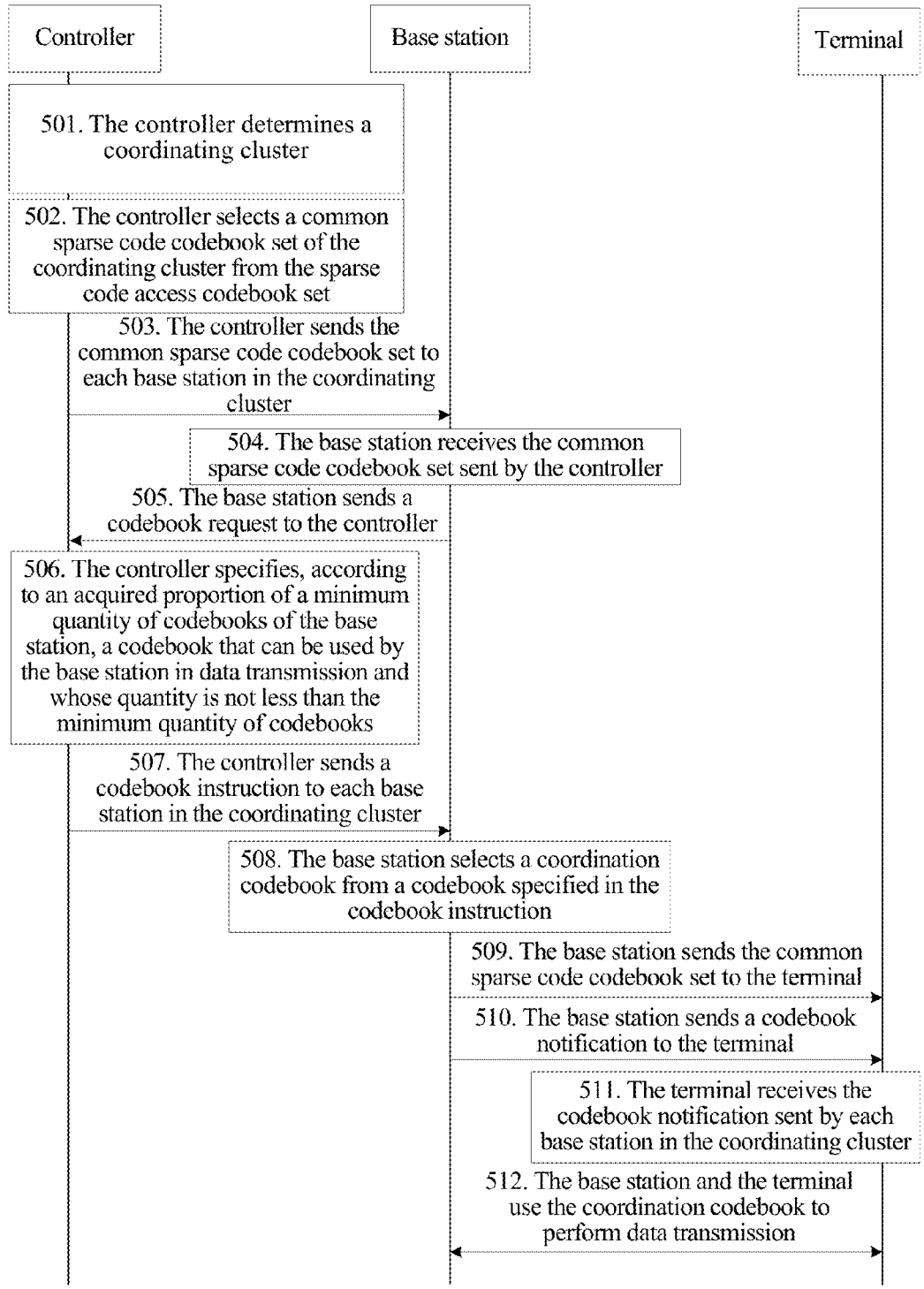
FIG. 5B is a flowchart of a data transmission process according to an embodiment of the present patent application.

In a scenario shown in FIG. 5A, base stations controlled and managed by a controller Controller5 include BS51, BS52, BS53, and the like; a terminal UE5 is located in a common coverage area of BS51, BS52, and BS53. Controller5 determines, according to a data transmission request from UE5 and a method for forming a coordinating cluster, that BS51, BS52, and BS53 form a coordinating cluster to provide data transmission for UE5. As shown in FIG. 5B, a specific process is as follows:

501: A Controller Determines a Coordinating Cluster.

Controller5 determines that BS51, BS52, and BS53 form a coordinating cluster 51 to perform data transmission for UE5.

BS51 further belongs to another coordinating cluster 52.

502: The Controller Determines, from a Sparse Code Access Codebook Set, at Least One Codebook that can be Used for Base Station Coordination to Form a Common Sparse Code Codebook Set.

A sparse code access codebook set that can be used by all base stations is S5={C51, C52, . . . , C58}. Sparse code access codebook sets that may be acquired by Controller5 and can be used by BS51, BS52, and BS53 are respectively S51={C51, C52, . . . , C58}, S52={C51, C52, . . . , C57} and S53={C52, C53, . . . , C58}, and Controller5 may reserve a codebook C57 as a reserved codebook for other use. Therefore, Controller5 determines that a common sparse code codebook set of the coordinating cluster 51 is S5'={C52, C53, . . . , C56}.

503: The Controller Sends the Common Sparse Code Codebook Set to Each Base Station in the Coordinating Cluster.

Controller5 separately sends the common sparse code codebook set S5'={C52, C53, . . . , C56} to BS51, BS52, and BS53.

504: The Base Station Receives and Saves the Common Sparse Code Codebook Set from the Controller.

BS51, BS52, and BS53 receive and save the common sparse code codebook set S5'={C52, C53, . . . , C56} from Controller5.

505: The Base Station Sends a Codebook Request to the Controller.

BS51, BS52, and BS53 separately determine information about a minimum quantity of codebooks needed by each base station.

BS51 and BS53 determine that the quantities of codebooks needed are both one. BS52 determines that the quantity of codebooks needed is two.

Figure 5C:
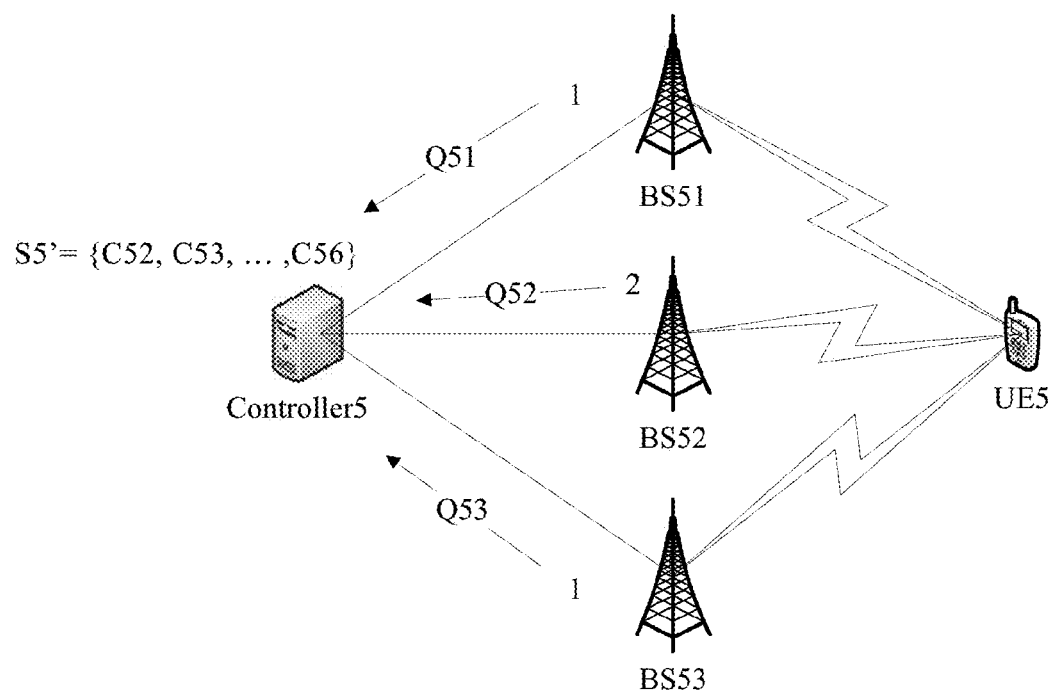
FIG. 5C is a schematic diagram of exchanging information between a controller and a base station according to an embodiment of the present patent application.

As shown in FIG. 5C, BS51, BS52, and BS53 respectively send codebook requests Q51, Q52, and Q53 to Controller5. Q51, Q52, and Q53 separately carry the information about the minimum quantity of codebooks needed by each base station.

506: The Controller Receives the Codebook Request from Each Base Station in the Coordinating Cluster, and Determines, According to the Information about the Minimum Quantity of Codebooks, a Proportion of the Minimum Quantity of Codebooks of the Base Station in the Coordinating Cluster.

Controller5 may obtain, according to Q51, Q52, and Q53 acquired by Controller5 and respectively from BS51, BS52, and BS53, that the minimum quantities of codebooks respectively needed by BS51, BS52, and BS53 are respectively one, two, and one, and allocate, according to a proportion of the minimum quantities of codebooks respectively needed by BS51, BS52, and BS53, quantities of codebooks that can respectively be used by BS51, BS52, and BS53 to perform data transmission and are in the common sparse code codebook set S5'={C52, C53, . . . , C56}.

A quantity of codebooks in the common sparse code codebook set S5'={C52, C53, . . . , C56} is five. Controller5 determines, according to a rounded-down method, the quantity of codebooks to be allocated to each base station in the coordinating cluster 51, that is, respectively allocates one codebook, two codebooks, and one codebook to BS51, BS52, and BS53. Specifically, S51'={C52}, S52'={C53, C54}, and S53'={C55} are specified in a sequence to specify codebooks that can respectively be used by BS51, BS52, and BS53 to perform data transmission.

507: The Controller Sends a Codebook Instruction to Each Base Station in the Coordinating Cluster.

Figure 5D:
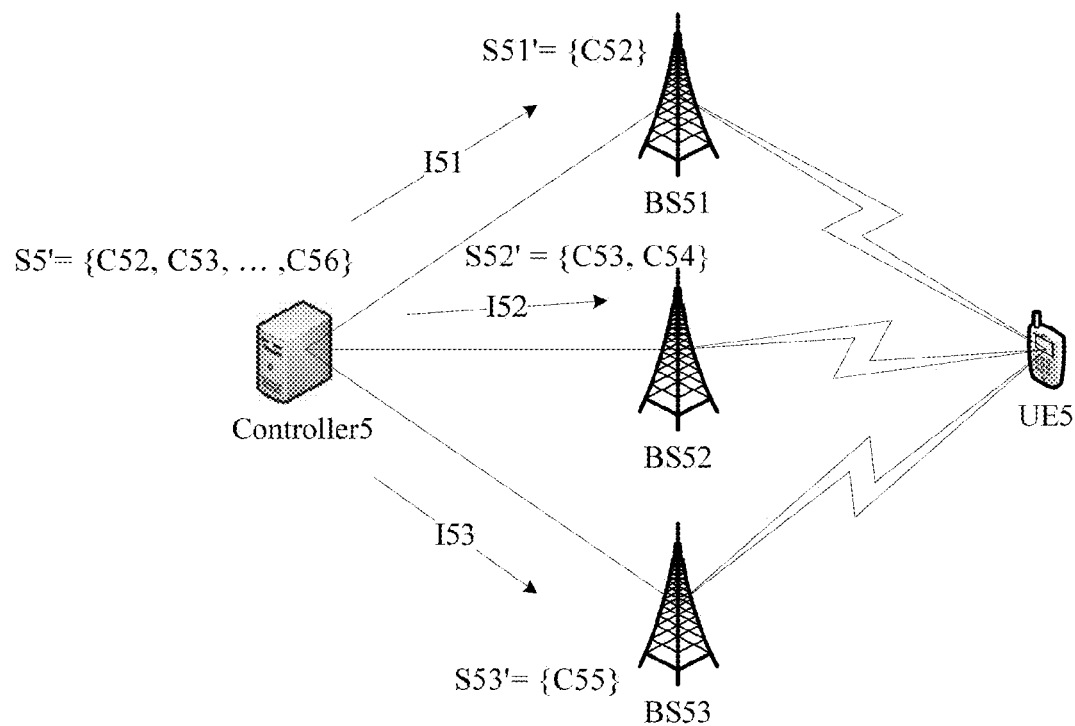
FIG. 5D is a schematic diagram of exchanging information between a controller and a base station according to an embodiment of the present patent application.

Controller5 respectively sends codebook instructions I51, I52, and I53 to BS51, BS52, and BS53 in the coordinating cluster 51. As shown in FIG. 5D, I51, I52, and I53 respectively carry non-empty subsets S51'={C52}, S52'={C53, C54}, and S53'={C55}, of the common sparse code codebook set, determined by the controller, and are used to specify the codebooks that can respectively be used by BS51, BS52, and BS53 to perform data transmission.

In addition, Controller5 further needs to specify, by using coordinating cluster information, I51 as a codebook instruction used by BS51 to perform data transmission in the coordinating cluster 51.

508: The Base Station Determines a Coordination Codebook from a Codebook Specified in the Codebook Instruction.

BS51 and BS53 determine, respectively from S51'={C52} and S53'={C55}, C52 and C55 as coordination codebooks, and BS52 determines, from S52'={C53, C54}, C54 as a coordination codebook, where the coordination codebooks are used to perform data transmission with UE5 in a data transmission process.

That BS52 determines, from S52'={C53, C54}, C54 as a coordination codebook may be implemented by using any well-known technical means. For example, BS52 determines, according to CQI information fed back by UE5, C54 that enables the greatest channel gain of UE5 as the coordination codebook.

509: The Base Station Sends the Common Sparse Code Codebook Set to a Terminal.

BS51, BS52, and BS53 all send the common sparse code codebook set S5'={C52, C53, . . . , C56} of the coordinating cluster 51 to UE5. Because base stations in the coordinating cluster, namely, BS51, BS52, and BS53 have no information exchange with each other, and data sending processes are mutually independent, BS51, BS52, and BS53 may separately send the common sparse code codebook set S5' to UE5.

510: The Base Station Sends a Codebook Notification to the Terminal.

Figure 5E:
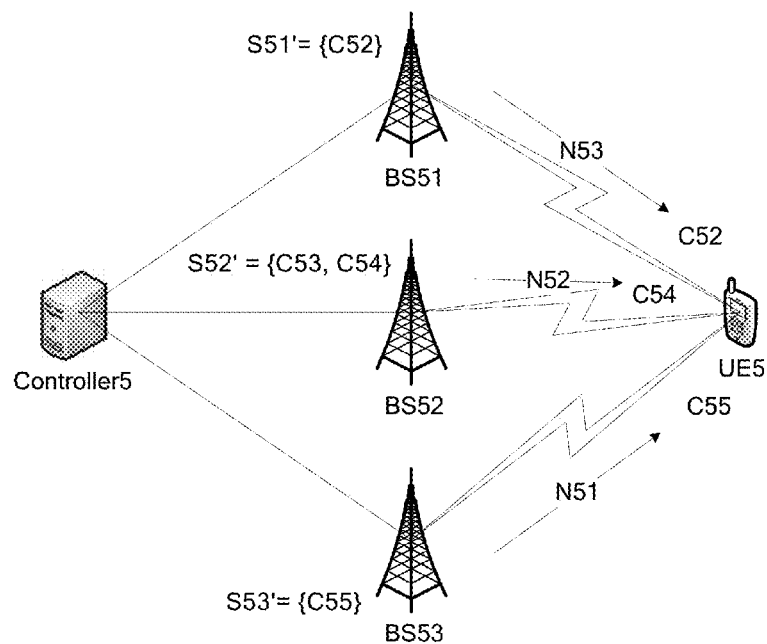
FIG. 5E is a schematic diagram of exchanging information between a base station and a terminal according to an embodiment of the present patent application.

As shown in FIG. 5E, BS51, BS52, and BS53 respectively send codebook notifications N51, N52, and N53 to UE5, so as to notify UE5 that UE5 needs to use the codebook C52 to access BS51, use C54 to access BS52, and use C55 to access BS53.

511: The Terminal Receives the Codebook Notification from the Base Station in the Coordinating Cluster.

After receiving the codebook notifications N51, N52, and N53 respectively from BS51, BS52, and BS53, UE5 may determine a codebook that can be used in a data transmission process. That is, UE5 uses C52 to perform data transmission with BS51, uses C54 to perform data transmission with BS52, and uses C55 to perform data transmission with BS53.

512: The Base Station and the Terminal Use the Coordination Codebook to Perform Data Transmission.

If BS51 sends a data flow D51 to UE5 and uses C52 to perform codebook mapping on D51, BS52 sends a data flow D52 to UE5 and uses C54 to perform codebook mapping on D52, and BS53 sends a data flow D53 to UE5 and uses C55 to perform codebook mapping on D53, an actual data flow from BS51 is D51*C52, an actual data flow from BS52 is D52*C54, and an actual data flow from BS53 is D53*C55, where an operation symbol * is a self-defined operation symbol, and Z=X*Y represents an operation result obtained by performing, according to a codebook Y, codebook mapping on a data flow X.

UE5 uses C52, C54, and C55 to perform joint decoding on received data flows, and respectively obtains D51, D52, and D53 by means of decoding.

If the terminal fails in decoding D52, the terminal sends a retransmission request to BS52 that sends D52. After receiving the retransmission request from UE5, BS52 resends D52 to UE5.

Figure 6:
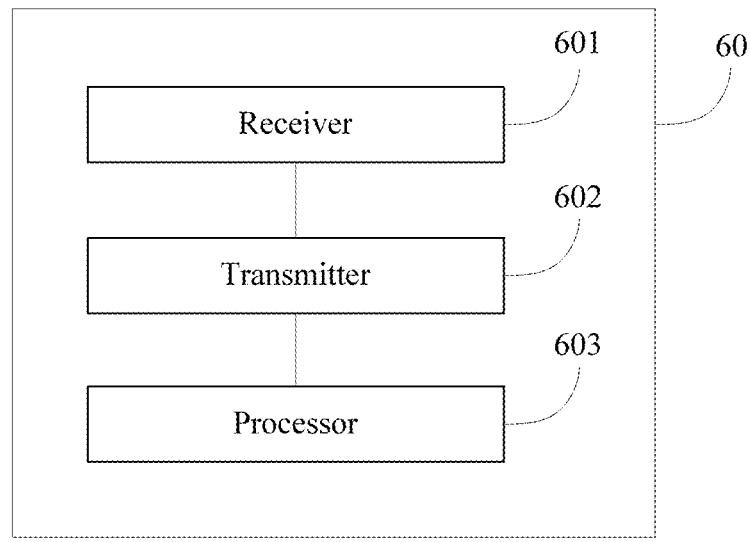
FIG. 6 is a simplified block diagram of a base station according to an embodiment of the present patent application.

A base station 60 is shown in FIG. 6. The base station 60 may be a base station in various forms in a communications system, such as a macro base station, a home base station, or a small cell. The base station 60 specifically includes:

a receiver 601, configured to receive a codebook instruction from a controller, where the codebook instruction is used to specify a codebook that can be used by the base station in data transmission with a terminal; the codebook belongs to a common sparse code codebook set; the common sparse code codebook set is a set of sparse code codebooks that can be used by each base station in a coordinating cluster to perform data transmission; and the coordinating cluster is a cluster of base stations that provide data transmission for a same terminal, where codebooks that can be used by the base stations in the coordinating cluster in data transmission with the terminal are mutually different;

a transmitter 602, configured to send a codebook notification to the terminal, where the codebook notification is used to notify the terminal of a coordination codebook; the coordination codebook is a codebook that is used by a base station in the coordinating cluster to perform data transmission with the terminal; and the coordination codebook belongs to a codebook specified in a codebook instruction received by the base station in the coordinating cluster; and a processor 603, configured to use the coordination codebook to perform data transmission with the terminal.

Optionally, in a specific base station device, the receiver and the transmitter are in independent forms and exist separately, or are integrated in a transceiver to bear functions both of the receiver and the transmitter at the same time, which is not limited.

The receiver 601 may be further configured to receive a common sparse code codebook set from the controller.

The transmitter 602 may be further configured to:
send a codebook request to the controller, where the codebook request carries information about a minimum quantity of codebooks needed by the base station, so that the controller allocates, according to the minimum quantity of codebooks, the codebook that can be used by the base station in data transmission, where the codebook instruction is further used to specify a codebook that can be used by the base station to perform data transmission, and a quantity of codebooks specified in the codebook instruction is not less than the minimum quantity of codebooks.

The transmitter 602 may be further configured to:
send the common sparse code codebook set to the terminal, so that the terminal receives and saves the common sparse code codebook set, and so that the terminal determines, from the common sparse code codebook set according to the codebook notification, the coordination codebook for performing data transmission with the base station.

The processor 603 may be further configured to:
determine, according to a quantity of data flows in data transmission, the minimum quantity of codebooks needed, where the minimum quantity of codebooks is not less than the quantity of data flows.

The processor 603 may be further configured to:
determine, from the common sparse code codebook set according to the codebook instruction, the codebook that can be used by the base station in data transmission.

The codebook instruction further includes coordinating cluster information, and the processor 603 may be further configured to:
determine, according to the coordinating cluster information, a coordinating cluster applicable to the codebook instruction.

Figure 7:
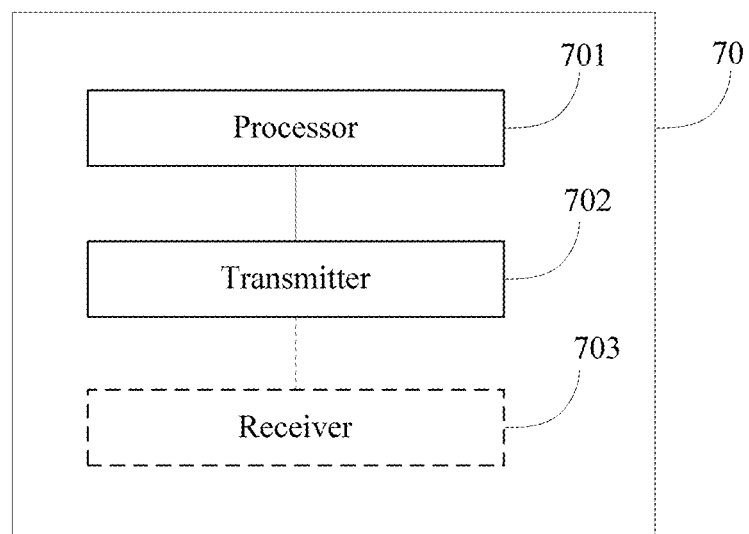
FIG. 7 is a simplified block diagram of a controller according to an embodiment of the present patent application.

A controller 70 is shown in FIG. 7. The controller 70 may be in an independent form, or may be integrated in another control node of a communications system. The controller 70 specifically includes:

a processor 701, configured to determine a coordinating cluster, where the coordinating cluster is a cluster of base stations that provide data transmission for a same terminal; and a transmitter 702, configured to send a codebook instruction to each base station in the coordinating cluster, where the codebook instruction is used to specify a codebook that can be used by each base station in the coordinating cluster in data transmission with the terminal; the codebooks that can be used by the base stations in data transmission belong to a common sparse code codebook set and are mutually different; and the common sparse code codebook set is a set of sparse code codebooks that can be used by each base station in the coordinating cluster to perform data transmission.

The controller 70 may further include:
a receiver 703, configured to receive a codebook request from each base station in the coordinating cluster, where the codebook request carries information about a minimum quantity of codebooks needed by the base station.

Optionally, in a specific controller device, the receiver and the transmitter may be in independent forms and exist separately, or may be integrated in a transceiver to bear functions both of the receiver and the transmitter at the same time, which is not limited in this embodiment of the present patent application.

The receiver 703 may be further configured to:
receive a codebook request from each base station in the coordinating cluster, where the codebook request carries information about a minimum quantity of codebooks needed by the base station, where the codebook instruction is further used to specify a codebook that can be used by each base station in the coordinating cluster in data transmission, and a quantity of codebooks specified in the codebook instruction is not less than the minimum quantity of codebooks.

The processor 701 may be further configured to:
determine, according to the information about the minimum quantity of codebooks, a proportion of the minimum quantity of codebooks for each base station in the coordinating cluster, and determine, according to the proportion of the minimum quantity of codebooks, a proportion of a quantity of codebooks that can be used by each base station in the coordinating cluster in data transmission with the terminal.

The codebook instruction from the transmitter 702 to each base station in the coordinating cluster further includes coordinating cluster information, where the coordinating cluster information is used by the base station receiving the codebook instruction to determine, according to the coordinating cluster information, a coordinating cluster applicable to the codebook instruction.

The transmitter 702 may be further configured to:
send the common sparse code codebook set to each base station in the coordinating cluster, so that each base station in the coordinating cluster receives and saves the common sparse code codebook set, and so that each base station in the coordinating cluster determines, from the common sparse code codebook set according to the codebook instruction, a coordination codebook for performing data transmission with the terminal, where the coordination codebook is a codebook that is used by a base station in the coordinating cluster to perform data transmission with the terminal.

Figure 8:
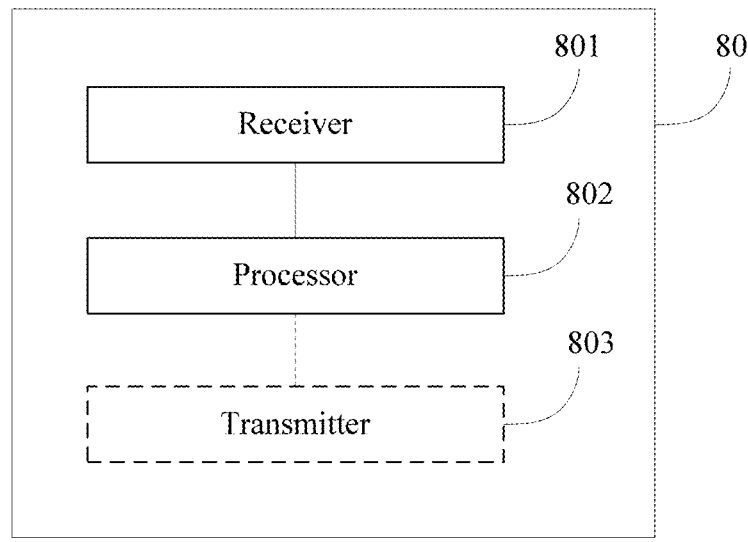
FIG. 8 is a simplified block diagram of a terminal according to an embodiment of the present patent application.

A terminal 80 is shown in FIG. 8. The terminal 80 specifically includes:

a receiver 801, configured to receive a codebook notification from at least one base station in a coordinating cluster, where the codebook notification is used by the at least one base station to notify the terminal of a coordination codebook; the coordination codebook is a sparse code codebook that is used by the at least one base station to perform data transmission with the terminal; and the coordinating cluster is a cluster of base stations that provide data transmission for a same terminal, where sparse code codebooks that can be used by the base stations in the coordinating cluster in data transmission with the terminal are mutually different; and a processor 802, configured to use the coordination codebook to perform data transmission with the at least one base station.

The receiver 801 may be further configured to:

receive and save a common sparse code codebook set from a base station in the coordinating cluster.

The processor 802 may be further configured to:

determine, from the common sparse code codebook set, the coordination codebook according to the codebook notification.

The processor 802 may be further configured to:

acquire the coordination codebook from the codebook notification, and use the coordination codebook to decode at least one received data flow from the at least one base station.

The terminal 80 may further include:

a transmitter 803, configured to send a retransmission request to a base station that sends the data flow that fails to be decoded, where the retransmission request is used to request the base station that sends the data flow that fails to be decoded to resend the data flow that fails to be decoded.

The receiver and the transmitter may be in independent forms and exist separately, or may be integrated in a transceiver to bear functions both of the receiver and the transmitter at the same time, which is not limited in this application.

Figure 9:
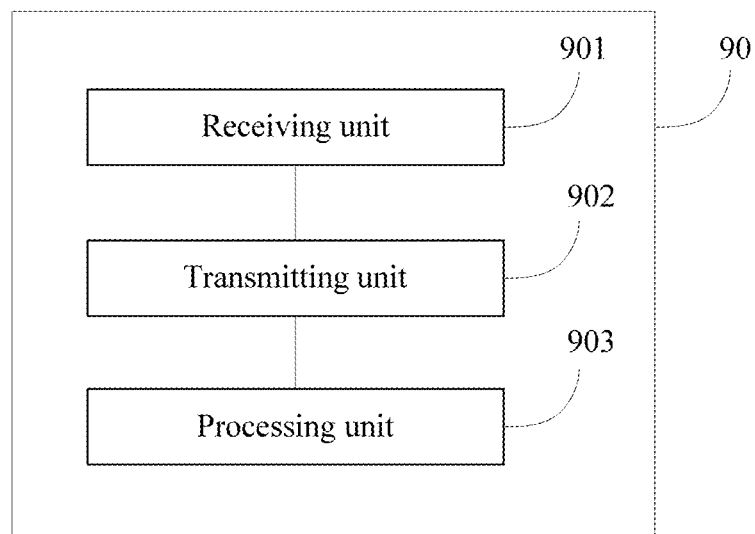
FIG. 9 is a functional block diagram of a base station according to an embodiment of the present patent application.

In terms of functionality, a base station 90 is shown in FIG. 9. The base station 90 may be a base station in various forms in a communications system, such as a macro base station, a home base station, or a small cell. The base station 90 specifically includes the following units:

a receiving unit 901, configured to receive a codebook instruction from a controller, where the codebook instruction is used to specify a codebook that can be used by the base station in data transmission with a terminal; the codebook belongs to a common sparse code codebook set; the common sparse code codebook set is a set of sparse code codebooks that can be used by each base station in a coordinating cluster to perform data transmission; and the coordinating cluster is a cluster of base stations that provide data transmission for a same terminal, where codebooks that can be used by the base stations in the coordinating cluster in data transmission with the terminal are mutually different;

a transmitting unit 902, configured to send a codebook notification to the terminal, where the codebook notification is used to notify the terminal of a coordination codebook; the coordination codebook is a codebook that is used by a base station in the coordinating cluster to perform data transmission with the terminal; and the coordination codebook belongs to a codebook specified in a codebook instruction received by the base station in the coordinating cluster; and a processing unit 903, configured to use the coordination codebook to perform data transmission with the terminal.

In a specific base station device, the receiving unit and the transmitting unit may be in independent forms and exist separately, or may be integrated in a transceiver unit to bear functions both of the receiving unit and the transmitting unit at the same time, which is not limited in this embodiment of the present patent application.

The receiving unit 901 may be further configured to:

receive a common sparse code codebook set from the controller.

The transmitting unit 902 may be further configured to:

send a codebook request to the controller, where the codebook request carries information about a minimum quantity of codebooks needed by the base station, so that the controller allocates, according to the minimum quantity of codebooks, the codebook that can be used by the base station in data transmission, where the codebook instruction is further used to specify a codebook that can be used by the base station to perform data transmission, and a quantity of codebooks specified in the codebook instruction is not less than the minimum quantity of codebooks.

The transmitting unit 902 may be further configured to:

send the common sparse code codebook set to the terminal, so that the terminal receives and saves the common sparse code codebook set, and so that the terminal determines, from the common sparse code codebook set according to the codebook notification, the coordination codebook for performing data transmission with the base station.

The processing unit 903 may be further configured to:

determine, according to a quantity of data flows in data transmission, the minimum quantity of codebooks needed, where the minimum quantity of codebooks is not less than the quantity of data flows.

The processing unit 903 may be further configured to:

determine, from the common sparse code codebook set according to the codebook instruction, the codebook that can be used by the base station in data transmission.

The codebook instruction may further include coordinating cluster information, and the processing unit 903 may be further configured to:

determine, according to the coordinating cluster information, a coordinating cluster applicable to the codebook instruction.

Figure 10:
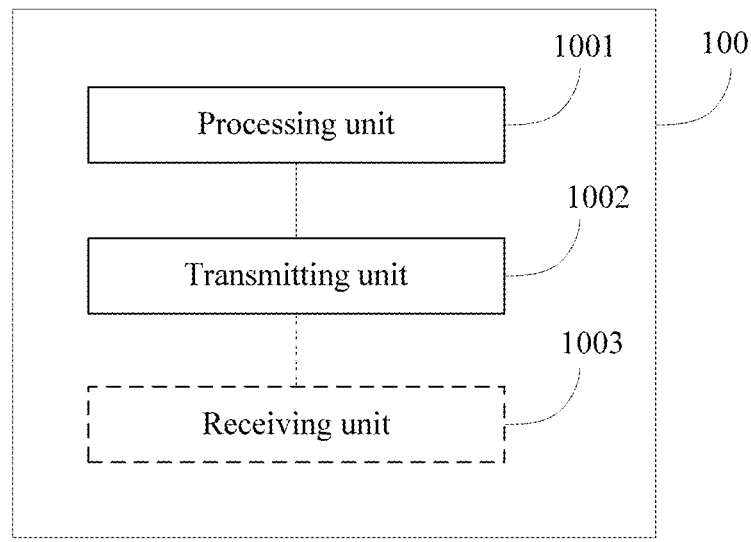
FIG. 10 is a functional block diagram of a controller according to an embodiment of the present patent application.

In terms of functionality, a controller 100 is shown in FIG. 10. The controller 100 may be in an independent form, or may be integrated in another control node in a communications system. The controller 100 specifically includes:

a processing unit 1001, configured to determine a coordinating cluster, where the coordinating cluster is a cluster of base stations that provide data transmission for a same terminal; and a transmitting unit 1002, configured to send a codebook instruction to each base station in the coordinating cluster, where the codebook instruction is used to specify a codebook that can be used by each base station in the coordinating cluster in data transmission with the terminal; the codebooks that can be used by the base stations in data transmission belong to a common sparse code codebook set and are mutually different; and the common sparse code codebook set is a set of sparse code codebooks that can be used by each base station in the coordinating cluster to perform data transmission.

An optional solution of the controller 100 may further include:

a receiving unit 1003, configured to receive a codebook request from each base station in the coordinating cluster, where the codebook request carries information about a minimum quantity of codebooks needed by the base station.

The receiving unit and the transmitting unit may be in independent forms and exist separately, or may be integrated in a transceiver unit to bear functions both of the receiving unit and the transmitting unit at the same time, which is not limited in this embodiment of the present patent application.

The receiving unit 1003 may be further configured to:

receive a codebook request from each base station in the coordinating cluster, where the codebook request carries information about a minimum quantity of codebooks needed by the base station, where the codebook instruction is further used to specify a codebook that can be used by each base station in the coordinating cluster in data transmission, and a quantity of codebooks specified in the codebook instruction is not less than the minimum quantity of codebooks.

The processing unit 1001 may be further configured to:

determine, according to the information about the minimum quantity of codebooks, a proportion of the minimum quantity of codebooks for each base station in the coordinating cluster, and determine, according to the proportion of the minimum quantity of codebooks, a proportion of a quantity of codebooks that can be used by each base station in the coordinating cluster in data transmission with the terminal.

The codebook instruction from the transmitting unit 1002 to each base station in the coordinating cluster may further include coordinating cluster information, where the coordinating cluster information may be used by the base station receiving the codebook instruction to determine, according to the coordinating cluster information, a coordinating cluster applicable to the codebook instruction.

The transmitting unit 1002 may be further configured to:

send the common sparse code codebook set to each base station in the coordinating cluster, so that each base station in the coordinating cluster receives and saves the common sparse code codebook set, and so that each base station in the coordinating cluster determines, from the common sparse code codebook set according to the codebook instruction, a coordination codebook for performing data transmission with the terminal, where the coordination codebook is a codebook that is used by a base station in the coordinating cluster to perform data transmission with the terminal.

Figure 11:
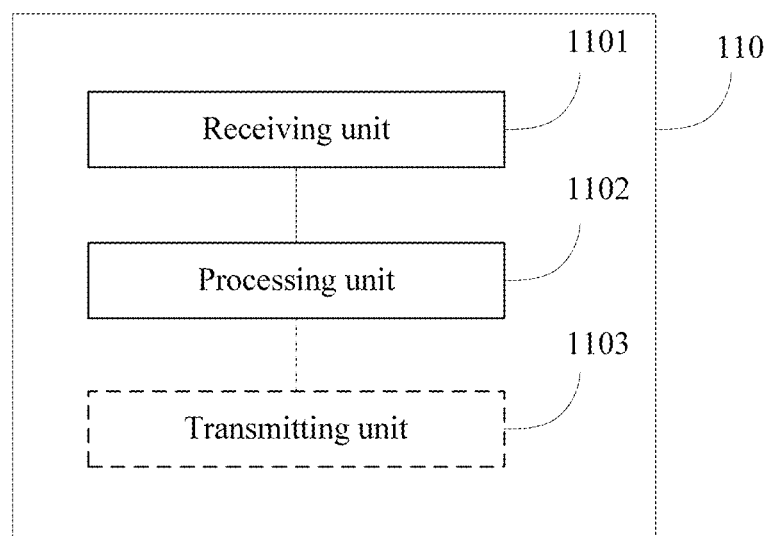
FIG. 11 is a functional block diagram of a terminal according to an embodiment of the present patent application.

In terms of functionality, a terminal 110 is shown in FIG. 11. The terminal 110 includes the following functional units:

a receiving unit 1101, configured to receive a codebook notification from at least one base station in a coordinating cluster, where the codebook notification is used by the at least one base station to notify the terminal of a coordination codebook; the coordination codebook is a sparse code codebook that is used by the at least one base station to perform data transmission with the terminal; and the coordinating cluster is a cluster of base stations that provide data transmission for a same terminal, where sparse code codebooks that can be used by the base stations in the coordinating cluster in data transmission with the terminal are mutually different; and a processing unit 1102, configured to use the coordination codebook to perform data transmission with the at least one base station.

The receiving unit 1101 may be further configured to:

receive and save a common sparse code codebook set from a base station in the coordinating cluster.

The processing unit 1102 may be further configured to:

determine, from the common sparse code codebook set, the coordination codebook according to the codebook notification.

The processing unit 1102 may be further configured to:

acquire the coordination codebook from the codebook notification, and use the coordination codebook to decode at least one received data flow from the at least one base station.

An optional solution of the terminal 110 may further include:

a transmitting unit 1103, configured to send a retransmission request to a base station that sends the data flow that fails to be decoded, where the retransmission request is used to request the base station that sends the data flow that fails to be decoded to resend the data flow that fails to be decoded.

The transmitting unit may be in independent forms and exist separately, or may be integrated in a transceiver unit to bear functions both of the receiving unit and the transmitting unit at the same time, which is not limited in this application.

For names of each parameter and each device in the foregoing description, a person skilled in the art may use other naming manners, which should also fall within the protection scope of the present patent application.

According to a data transmission method and an apparatus provided in the present patent application, sparse code codebooks that can be used by a base station in a coordinating cluster in data transmission with a terminal are mutually different. This implements that base stations separately perform data transmission with the terminal without performing data exchange or channel information exchange between the base stations, thereby reducing system overheads and improving network transmission efficiency.

Based on the foregoing descriptions of the implementation manners, a person skilled in the art may clearly understand that the present application may be implemented by software in addition to necessary general hardware. Based on such an understanding, all or some steps in the technical solutions of the present patent application may be implemented by a program instructing related hardware. The program may be stored in a computer-readable storage medium. When the program runs, the steps in the foregoing method embodiments are performed. The storage medium includes a ROM/RAM, a magnetic disk, an optical disc, and the like.

The foregoing descriptions are merely specific implementation manners of the present patent application, and are not intended to limit the protection scope of the present patent application. Any variation or replacement readily figured out by a person skilled in the art within the technical scope disclosed in the present patent application shall fall within the protection scope of the present patent application. Therefore, the protection scope of the present patent application shall be subject to the protection scope of the claims.

The invention claimed is:

1. A base station, comprising:
a receiver, configured to receive codebook instruction from a network controller, wherein one or more codebooks that are supported by the base station in data transmission with a terminal are specified in the codebook instruction, and wherein the one or more codebooks specified in the codebook instruction belong to a common sparse code codebook set, and the common sparse code codebook set is a set of sparse code codebooks that are supported by each base station in a coordinating cluster of base stations in performing data transmission with the terminal;

a processor, configured to select one or more coordination codebooks from the one or more codebooks specified in the codebook instruction; and a transmitter, configured to send a codebook notification to the terminal, wherein the selected one or more coordination codebooks are specified in the codebook notification; and wherein the base station is one of the coordinating cluster of base stations that perform data transmission with the terminal.

2. The base station according to claim 1, wherein the processor is further configured to perform the data transmission with the terminal using the one or more coordinating codebooks, and wherein codebooks that are supported by the base stations in the coordinating cluster in data transmission with the terminal are mutually different.

3. The base station according to claim 1, wherein the transmitter is further configured to send a codebook request to the network controller, wherein the codebook request carries information about a minimum quantity of codebooks needed by the base station in performing data transmission with the terminal, and wherein a quantity of codebooks specified in the codebook instruction is not less than the minimum quantity of codebooks needed by the base station in performing data transmission with the terminal.

4. The base station according to claim 3, wherein the processor is further configured to determine, according to a quantity of data flows in the data transmission with the terminal, the minimum quantity of codebooks needed, wherein the minimum quantity of codebooks needed is not less than the quantity of the data flows.

5. The base station according to claim 1, wherein the receiver is further configured to receive the common sparse code codebook set from the network controller.

6. The base station according to claim 1, wherein the codebook instruction further comprises information of the coordinating cluster; and wherein the processor is further configured to determine, according to the information of the coordinating cluster, base stations that belong to the coordinating cluster.

7. The base station according to claim 5, wherein the transmitter is further configured to send the common sparse code codebook set to the terminal.

8. A network controller, comprising:

a processor, configured to determine a coordinating cluster, wherein the coordinating cluster is a cluster of base stations that perform data transmission with a same terminal; and a transmitter, configured to send codebook instruction to each base station in the coordinating cluster, wherein one or more codebooks that are supported by a base station in the coordinating cluster for performing data transmission with the terminal are specified in the codebook instruction sent to the base station; and wherein the one or more codebooks that are supported by the base station belong to a common sparse code codebook set, and the common sparse code codebook set is a set of sparse code codebooks that are supported by each base station in the coordinating cluster to perform the data transmission with the terminal.

9. The network controller according to claim 8, wherein codebooks that are supported by the base stations in the coordinating cluster in performing data transmission with the terminal are mutually different.

10. The network controller according to claim 8, further comprising a receiver, wherein the receiver is configured to receive a codebook request from each base station in the coordinating cluster, wherein the codebook request carries information about a minimum quantity of codebooks needed by the base station in performing data transmission with the terminal; and the processor is further configured to determine, according to the information about the minimum quantity of codebooks needed by each base station, a proportion of the minimum quantity of codebooks for each base station in the coordinating cluster, and determine, according to the proportion of the minimum quantity of codebooks needed by each base station, a proportion of a quantity of codebooks that are supported by each base station in the coordinating cluster in data transmission with the terminal.

11. The network controller according to claim 10, wherein a quantity of codebooks specified in the codebook instruction to each base station in the coordinating cluster is not less than the minimum quantity of codebooks needed by the base station.

12. The network controller according to claim 8, wherein the codebook instruction further comprises information of the coordinating cluster, wherein the information of the coordinating cluster is used by the base station receiving the codebook instruction to determine base stations in coordinating cluster applicable to the codebook instruction.

13. The network controller according to claim 8, wherein the transmitter is further configured to send the common sparse code codebook set to each base station in the coordinating cluster.

14. A data transmission method, comprising:

receiving, by a base station, codebook instruction from a network controller, wherein one or more codebooks that are supported by the base station in data transmission with a terminal are specified in the codebook instruction, and wherein the one or more codebooks specified in the codebook instruction belong to a common sparse code codebook set and the common sparse code codebook set is a set of sparse code codebooks that can be used by each base station in a coordinating cluster of base stations in performing data transmission with the terminal;

selecting, by the base station, one or more coordination codebooks from the one or more codebooks specified in the codebook instruction; and sending, by the base station, a codebook notification to the terminal, wherein the selected one or more coordination codebooks are specified in the codebook notification; and wherein the base station is one of the coordinating cluster of base stations that perform data transmission with the terminal.

15. The method according to claim 14, further comprising:

performing, by the base station, data transmission with the terminal using the coordination codebooks;

wherein codebooks that are supported by the base stations in the coordinating cluster in data transmission with the terminal are mutually different.

16. The method according to claim 14, further comprising:

sending, by the base station, a codebook request to the network controller, wherein the codebook request carries information about a minimum quantity of codebooks needed by the base station in performing data transmission with the terminal, and wherein a quantity of codebooks specified in the codebook instruction is not less than the minimum quantity of codebooks needed by the base station in performing data transmission with the terminal.

17. The method according to claim 16, further comprising:

determining, according to a quantity of data flows in the data transmission with the terminal, the minimum quantity of codebooks needed, wherein the minimum quantity of codebooks needed is not less than the quantity of the data flows.

18. The method according to claim 14, further comprising:

receiving, by the base station, the common sparse code codebook set from the network controller.

19. The method according to claim 14, wherein the codebook instruction further comprises information of the coordinating cluster; and the method further comprises:

determining, according to the information of the coordinating cluster, base stations that belong to the coordinating cluster.

20. The method according to claim 18, further comprising:

sending, by the base station, the common sparse code codebook set to the terminal.

21. A data transmission method, comprising:

determining, by a network controller, a coordinating cluster, wherein the coordinating cluster is a cluster of base stations that perform data transmission with a same terminal; and sending, by the network controller, codebook instruction to each base station in the coordinating cluster, wherein one or more codebooks that are supported by a base station for performing data transmission with the terminal are specified in the codebook instruction sent to the base station; and wherein the one or more codebooks that are supported by the base station belong to a common sparse code codebook set, and the common sparse code codebook set is a set of sparse code codebooks that are supported by each base station in the coordinating cluster to perform the data transmission with the terminal.

22. The method according to claim 21, wherein codebooks that are supported by the base stations in the coordinating cluster in performing data transmission with the terminal are mutually different.

23. The method according to claim 21, further comprising:

receiving, by the network controller, a codebook request from each base station in the coordinating cluster, wherein the codebook request carries information about a minimum quantity of codebooks needed by the base station in performing data transmission with the terminal;

determining, by the network controller according to the information about the minimum quantity of codebooks needed by each base station, a proportion of the minimum quantity of codebooks for each base station in the coordinating cluster; and determining, by the network controller according to the proportion of the minimum quantity of codebooks needed by each base station, a proportion of a quantity of codebooks that are supported by each base station in the coordinating cluster in data transmission with the terminal.

24. The method according to claim 23, wherein a quantity of codebooks specified in the codebook instruction to each base station in the coordinating cluster is not less than the minimum quantity of codebooks needed by the base station.

25. The method according to claim 21, wherein the codebook instruction further comprises information of the coordinating cluster, the information of the coordinating cluster is used by the base station receiving the codebook instruction to determine base stations in the coordinating cluster applicable to the codebook instruction.

26. The method according to claim 21, further comprising:

sending, by the network controller, the common sparse code codebook set to each base station in the coordinating cluster.

* * * * *